US010782162B1

United States Patent
Gertlar et al.

(10) Patent No.: US 10,782,162 B1
(45) Date of Patent: Sep. 22, 2020

(54) INSTRUMENT CLUSTER POINTER

(71) Applicants: DENSO International America, Inc., Southfield, MI (US); DENSO CORPORATION, Kariya, Aichi-Pref. (JP)

(72) Inventors: Zakary Gertlar, Birmingham, MI (US); Jill Garcia, Waterford, MI (US)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/407,727

(22) Filed: May 9, 2019

(51) Int. Cl.
*B60Q 3/14* (2017.01)
*G01D 13/26* (2006.01)
*B60K 35/00* (2006.01)
*B60Q 3/62* (2017.01)

(52) U.S. Cl.
CPC .......... *G01D 13/265* (2013.01); *B60K 35/00* (2013.01); *B60Q 3/62* (2017.02); *B60K 2370/336* (2019.05); *B60K 2370/6992* (2019.05)

(58) Field of Classification Search
CPC ............................................... B60K 2370/336
USPC ....................................................... 362/23.21
See application file for complete search history.

(56) References Cited

U.S. PATENT DOCUMENTS

| | | | |
|---|---|---|---|
| 6,063,172 A | 5/2000 | Bokisa et al. | |
| 6,408,784 B1 | 6/2002 | Ross | |
| 7,637,623 B2 | 12/2009 | Wang et al. | |
| 7,665,413 B2 | 2/2010 | Birman et al. | |
| 10,072,955 B2 | 9/2018 | Miyazawa et al. | |
| 2004/0212977 A1* | 10/2004 | Ishii ....................... | G01D 11/28 362/23.2 |
| 2008/0202408 A1 | 8/2008 | Takato | |
| 2008/0264328 A1* | 10/2008 | Birman .................. | G01D 11/28 116/288 |
| 2014/0028131 A1* | 1/2014 | Esposito .............. | G01D 13/265 310/73 |
| 2014/0033965 A1* | 2/2014 | Ookura .................. | G01D 11/28 116/288 |
| 2015/0138751 A1* | 5/2015 | Sherman .............. | G01D 13/265 362/23.21 |
| 2019/0160945 A1* | 5/2019 | Otomo .................. | B60K 35/00 |

FOREIGN PATENT DOCUMENTS

JP 6063172 B2 1/2017

* cited by examiner

*Primary Examiner* — Christopher M Raabe
(74) *Attorney, Agent, or Firm* — Harness, Dickey & Pierce, P.L.C.

(57) ABSTRACT

A pointer for an instrument panel. The pointer includes a base. A shaft extends from the base. A blade extends from the base to reference indications on the instrument cluster. A diffuser is attached to the base over the shaft. The diffuser is configured to scatter light along a length of the blade and to a panel arranged over the base to illuminate the panel.

19 Claims, 5 Drawing Sheets

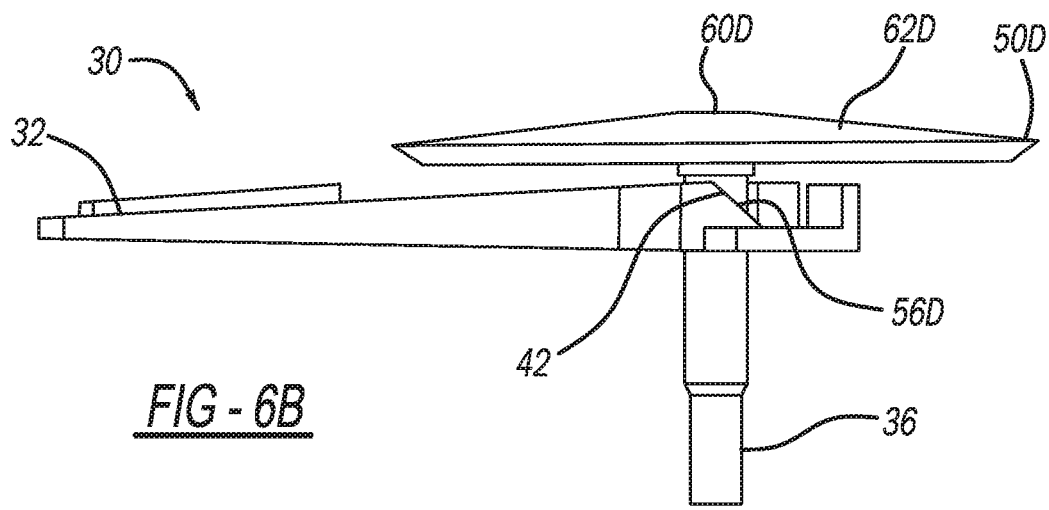
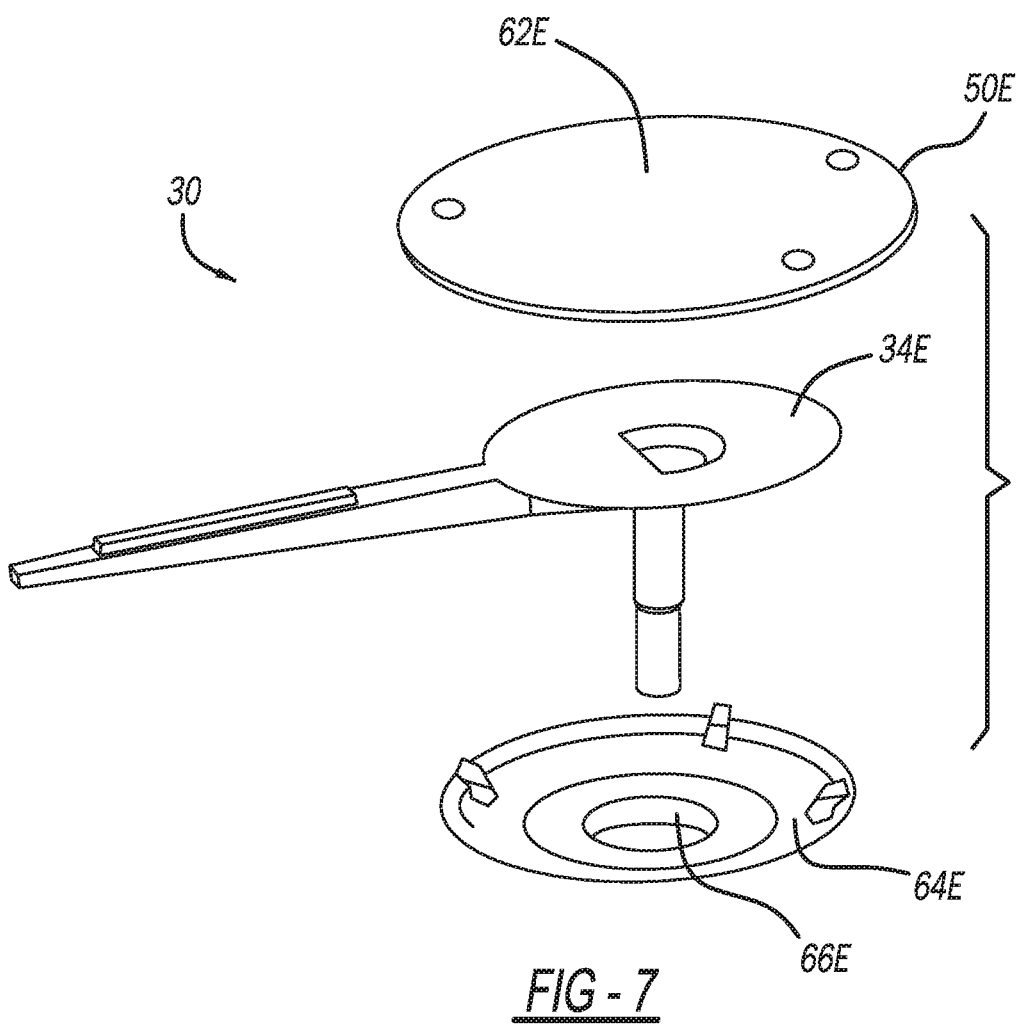

… (US 10,782,162 B1)

INSTRUMENT CLUSTER POINTER

FIELD

The present disclosure relates to a pointer for an instrument cluster.

BACKGROUND

This section provides background information related to the present disclosure, which is not necessarily prior art.

Instrument clusters, such as vehicle instrument clusters, typically include one or more gauges. Each gauge often has a suitable indicator, such as a pointer. The pointer is moved by a stepper motor, or any other suitable device. With respect to a speedometer, for example, the stepper motor moves the pointer so that it points to the current speed of the vehicle. Existing pointers are suitable for their intended use, but are subject to improvement. For example, an improved pointer that allows for a single light source to illuminate both the pointer and a decorative element arranged over the pointer would be desirable. The present disclosure includes pointers that provide these advantages, as well as numerous other advantages as explained in detail herein and as one skilled in the art will appreciate.

SUMMARY

This section provides a general summary of the disclosure, and is not a comprehensive disclosure of its full scope or all of its features.

The present disclosure includes a pointer for an instrument cluster. The pointer includes a base. A shaft extends from the base. A blade extends from the base to reference indications on the instrument cluster. A diffuser is attached to the base over the post. The diffuser is configured to scatter light along a length of the arm and to a panel arranged over the base to illuminate the panel.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

FIG. 6B is a side view of the pointer of FIG. 6A; and

FIG. 7 is a perspective view of an additional pointer in accordance with the present disclosure.

Corresponding reference numerals indicate corresponding parts throughout the several views of the drawings.

DETAILED DESCRIPTION

Example embodiments will now be described more fully with reference to the accompanying drawings.

Figure 1:
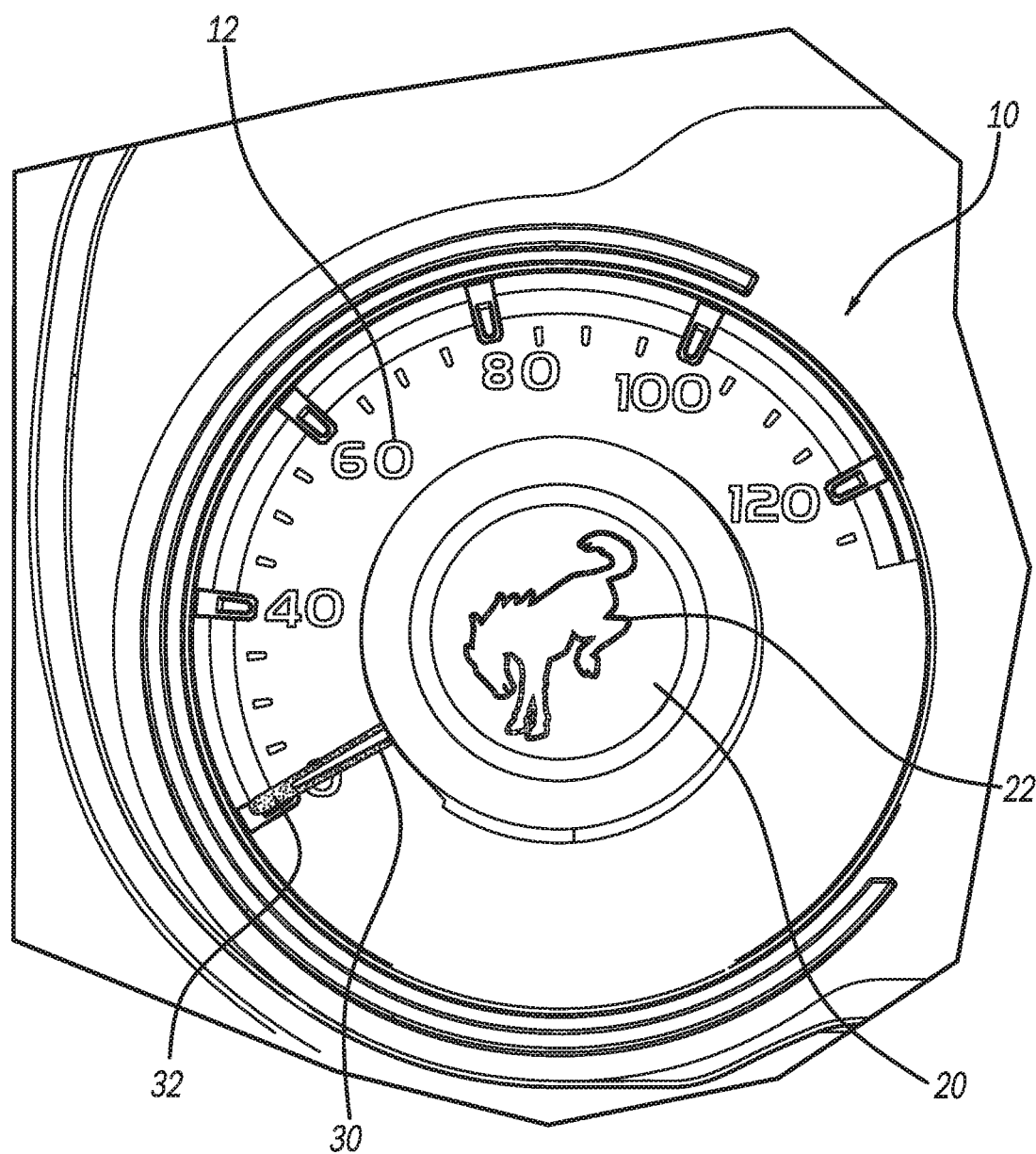
FIG. 1 illustrates a meter of an instrument cluster including a pointer and a panel over the pointer in accordance with the present disclosure, both the pointer and the panel can be illuminated by a common light source.

With initial reference to FIG. 1, an exemplary instrument cluster is illustrated at reference numeral 10. The instrument cluster 10 may be any suitable instrument cluster, such as a vehicle instrument cluster. The present disclosure applies to any other suitable instrument cluster as well, such as an instrument cluster of construction equipment, military equipment, infrastructure equipment (such as, pumps, generators, etc.), and any other machinery including a meter.

The instrument cluster 10 can include one or more meters, such as the speedometer of FIG. 1. The meter includes any suitable reference indicators 12, such as numerals indicating the speed of the vehicle. A pointer 30 is movable to position a blade 32 of the pointer 30 at the proper reference indicator 12 to convey information to an operator of the vehicle, such as the speed of the vehicle.

The present disclosure further includes a panel 20. The pointer 30 is arranged beneath the panel 20 with the blade 32 extending out from beneath the panel 20. The panel 20 includes any suitable picture or graphic 22. The graphic 22 is formed on the panel 20 in any suitable manner, such as by laser etching. For example, the panel 20 may be covered with any suitable acrylic or other material, and the graphic 22 may be etched in the material. Any other suitable printing technique may be used as well, such as pad printing. The graphic 22 may also be chrome plated on the panel 20, hot stamped on the panel 20, or deposited on the panel 20 by physical vapor deposition (PVD), for example. As another example, the graphic 22 may be molded together with the panel 20 by two-shot molding. As explained herein, both the graphic 22 and the blade 32 of the pointer 30 are illuminated by a common light emitting element, such as an LED 70 (see FIGS. 2 and 3).

With additional reference to FIGS. 2 and 3, the pointer 30 will now be described in additional detail. The pointer 30 includes a base 34 from which the blade 32 extends. Also extending from the base 34 is the shaft 36. The light emitting element 70 is aligned with the shaft 36. The blade 32 and the shaft 36 generally extend from the base 34 at a right angle relative to one another. The pointer 30 is rotated by any suitable motor 80, such as a servo or stepper motor. The motor 80 is connected directly or indirectly to the shaft 36 to rotate the pointer 30 to position the blade 32 at the proper reference indicator 12.

Figure 2:
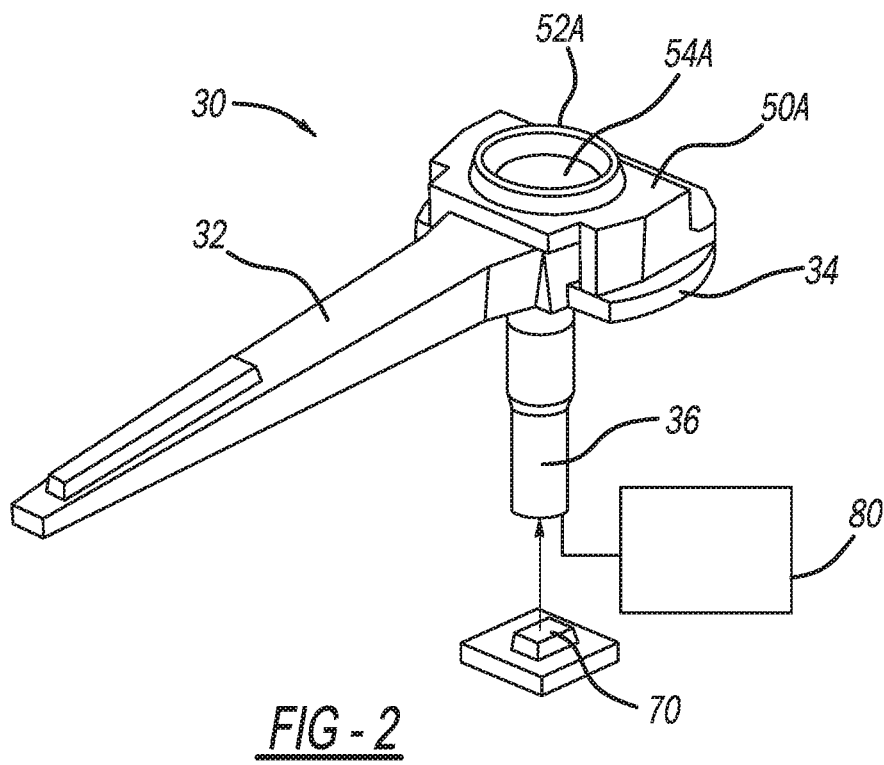
FIG. 2 is a perspective view of a pointer in accordance with the present disclosure.
Figure 3:
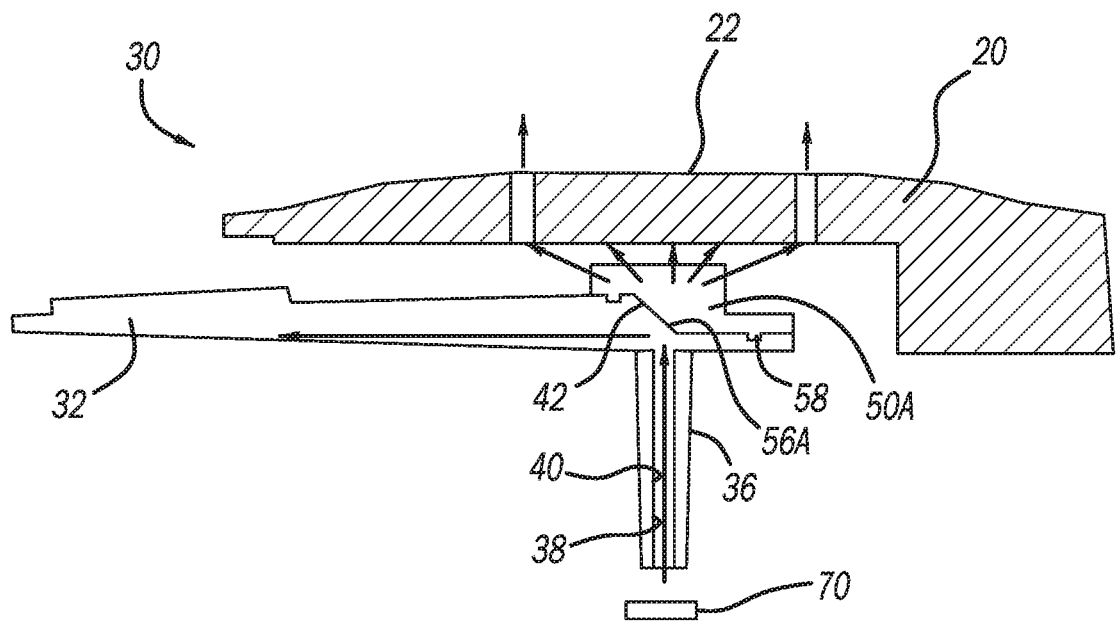
FIG. 3 is a cross-sectional view of the pointer of FIG. 2.

With particular reference to FIG. 3, the shaft 36 acts as a light guide or prism, which guides light from the light emitting element 70 to a diffuser 50A. Alternatively, the shaft 36 may define a passageway 38 with a prism 40. The shaft 36 and/or the prism 40 may be made of any suitable material, such as a clear polycarbonate (PC) material, a poly(methyl methacrylate) material, or a milky-type diffuser material. The prism 40 guides light from the light emitting element 70 through the passageway 38 of the shaft 36 to the diffuser 50A. In the example of FIGS. 2 and 3, the diffuser 50A is seated on an angled surface 42 of the base 34.

The diffuser 50A generally includes a circular reflective portion 52A, which surrounds a domed reflective portion 54A (see FIG. 2, for example). With particular reference to FIG. 3, the diffuser 50A further includes an angled surface 56A, which mates with the angled surface 42 of the base 34. The diffuser 50A is secured to the base 34 by any suitable fastener or fastening method 58, such as a heat stake, snap fit, press-fit, linear weld, 2-shot mold, etc. (see FIG. 3, for example).

The diffuser 50A is made of any material suitable to scatter/spread the light emitted by the light emitting element 70 along a length of the blade 32, and to the panel 20 to illuminate the graphic 22 thereof. Specifically, the angled surface 56A of the diffuser 50A is shaped and positioned to reflect light from the light emitting element 70 passing through the shaft 36 to the blade 32 to illuminate the arm 32. The circular reflective portion 52A and the domed reflective portion 54A are shaped and positioned to spread light from the LED passing through the shaft 36 to the panel 20 to illuminate the graphic 22. The diffuser 50A thus advantageously directs light from the same light emitting element 70 to both the blade 32 and the panel 20 to illuminate both the blade 32 and the graphic 22, thereby eliminating any need for multiple light emitting elements.

Figure 4A:
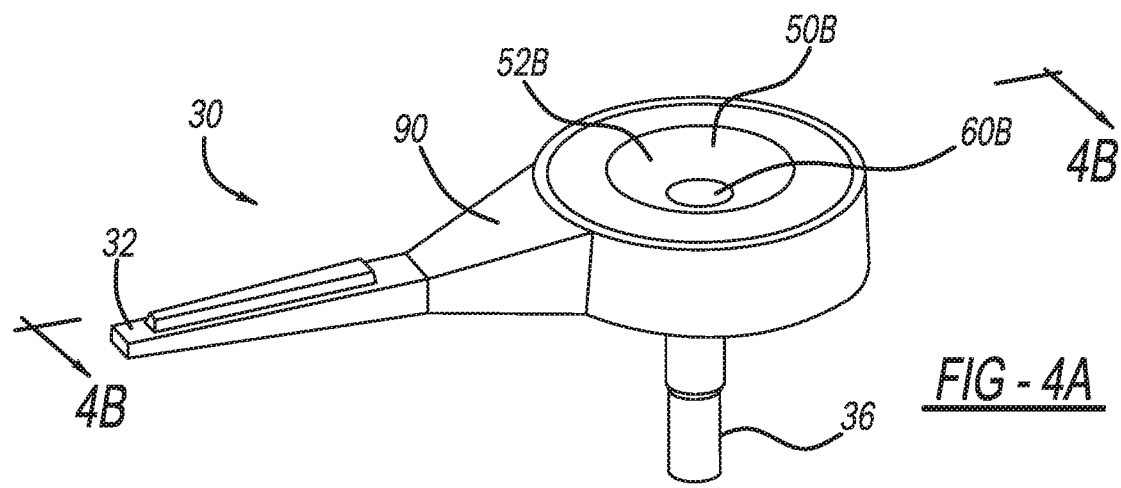
FIG. 4A is a perspective view of another pointer in accordance with the present disclosure.
Figure 4B:
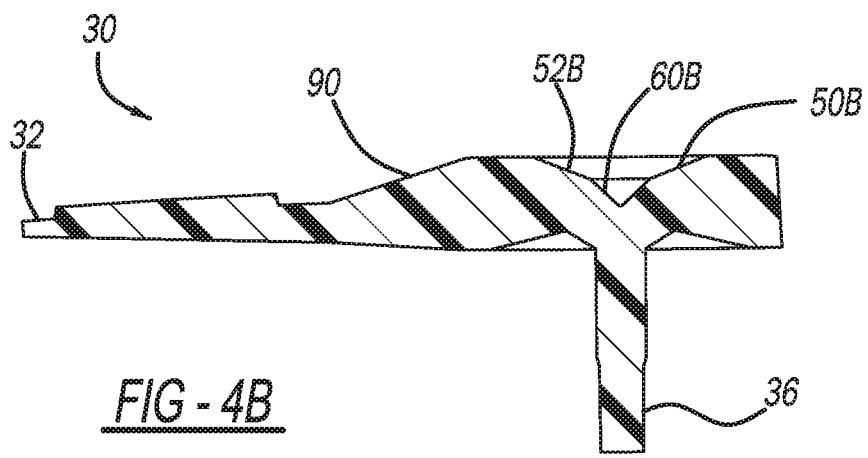
FIG. 4B is a cross-sectional view taken along line 4B-4B of FIG. 4A.

With reference to FIGS. 4A and 4B, the pointer 30 may include a diffuser 50B in place of the diffuser 50A. The diffuser 50B includes a circular reflective portion 52B and a center portion 60B. The circular reflective portion 52B and the center portion 60B are shaped and configured as illustrated in FIGS. 4A and 4B to reflect and scatter light from the light emitting element 70 both to the graphic 22 of the panel 20, and the blade 32 in order to simultaneously illuminate the graphic 22 and the blade 32. A tapered portion 90, which has an internal reflective surface, is arranged between the diffuser 50B and the blade 32 in order to focus light directed by the diffuser 50B to the blade 32, thereby enhancing the illumination of the blade 32.

Figure 5A:
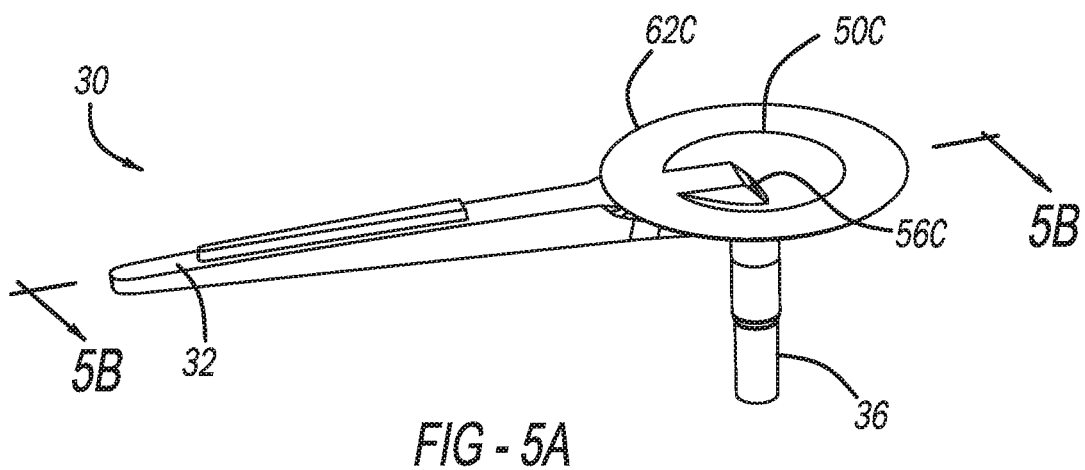
FIG. 5A is a perspective view of an additional pointer in accordance with the present disclosure.
Figure 5B:
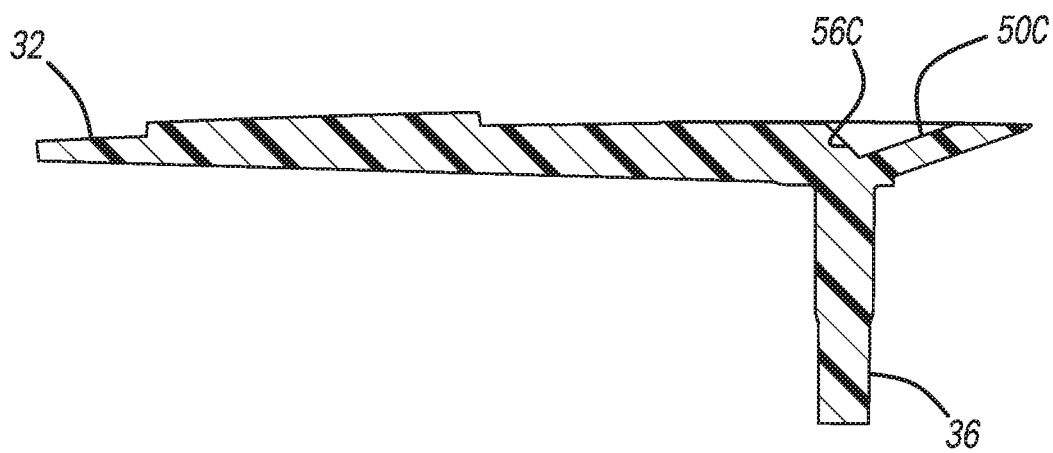
FIG. 5B is a cross-sectional view taken along line 5B-5B of FIG. 5A.

FIGS. 5A and 5B illustrate an additional diffuser 50C in accordance with the present disclosure. The diffuser 50C includes a disc portion 62C (see FIG. 5A). The disc portion 62C is shaped and otherwise configured to direct and scatter light from the light emitting device 70 to the panel 20 to illuminate the graphic 22. The diffuser 50C also includes an angled surface 56C, which is shaped and positioned to reflect light from the light emitting element 70 passing through the shaft 36 to the blade arm 32 to illuminate the arm 32.

Figure 6A:
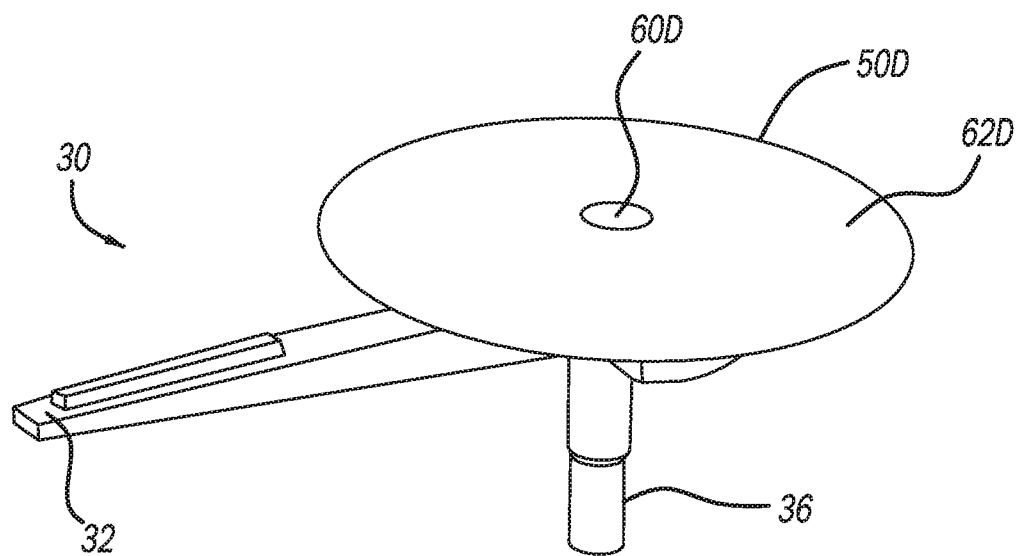
FIG. 6A is a perspective view of another pointer in accordance with the present disclosure.

With reference to FIGS. 6A and 6B, another diffuser in accordance with the present disclosure is illustrated at reference numeral 50D. The diffuser 50D includes a domed disc 62D having a center portion 60D. The center portion 60D is recessed within the domed disc 62D. The domed disc 62D is shaped and otherwise configured to direct and scatter light from the light emitting element 70 to the panel 20 to illuminate the graphic 22. The diffuser 50D includes an angled surface 56D. The angled surface 56D is shaped, positioned, and otherwise configured to direct light passing through the shaft 36 from the light emitting element 70 to the blade 32 to illuminate the blade 32.

FIG. 7 illustrates an additional diffuser in accordance with the present disclosure at reference numeral 50E. The diffuser 50E includes a disc 62E and a bottom surface 64E. The bottom surface 64E defines a center aperture 66E through which the shaft 36 extends. The base 34E can be enlarged as illustrated to accommodate the disc 62E being seated thereon. The disc 62E is sized, shaped, and otherwise configured to direct and scatter light from the light emitting element 70 to the graphic 22 of the panel 20 to illuminate the graphic 22. The bottom surface 64E is arranged at an undersurface of the base 34 opposite to the disc 62E. The disc 62E and the bottom surface 64E are secured together in any suitable manner, with the shaft 36 extending through the aperture 66E. The bottom surface 64E includes an internal reflective surface to further direct light to the panel 20 to illuminate the graphic 22 thereof.

The present disclosure thus advantageously provides for a pointer 30, which may include any one of the diffusers 50A, 50B, 50C, 50D, or 50E. The diffusers 50A-50E are each shaped, sized, and otherwise configured to direct light from the light emitting element 70 to the panel 20 to illuminate the graphic 22, and simultaneously to the blade 32 to illuminate the blade 32. The present disclosure thus advantageously eliminates any need for multiple light emitting elements (i.e., only a single light emitting element 70 can be used), thereby simplifying construction and reducing costs. Furthermore, the diffusers 50A-50E are each configured to spread the light outward across the entire graphic 22 to completely illuminate the graphic 22. This is in contrast to existing pointers, which merely direct light through the pointers without spreading or scattering the light. Also, the pointer 30 of the present disclosure is a "hubless" configuration, but the diffusers 50A-50E can be pressed by any suitable manufacturing equipment in order to press the pointer 30 (and particularly the shaft 36 thereof) into an assembly of the instrument cluster 10. One skilled in the art will appreciate that the present disclosure provides numerous additional advantages as well.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A pointer for an instrument panel, the pointer comprising:
   a base;
   a shaft extending from the base;
   a blade extending from the base to reference indications on the instrument cluster; and
   a diffuser attached to the base over the shaft, the diffuser configured to scatter light along a length of the blade; and
   a panel arranged over the base, the panel including a graphic illuminated by light from the diffuser passing through the panel.

2. The pointer of claim 1, wherein the shaft and the blade extend 90° relative to one another.

3. The pointer of claim 1, wherein the shaft defines a passageway including a prism on walls thereof that directs light from the shaft to the diffuser.

4. The pointer of claim 1, wherein the diffuser is attached to the base by a snap fit.

5. The pointer of claim 1, wherein the diffuser is attached to the base by at least one of a heat stake, snap fit, press fit, linear weld, and 2-shot molding.

6. The pointer of claim 1, wherein the diffuser includes an angled surface configured to direct light from the shaft to the arm.

7. The pointer of claim 1, wherein the diffuser includes a circular reflective portion on an outer surface of the diffuser that directs light from the shaft to the panel arranged over the base to illuminate the panel.

8. The pointer of claim 7, wherein the circular reflective portion surrounds a domed reflective portion.

9. The pointer of claim 1,
   wherein the diffuser includes a circular reflective portion on an outer surface of the diffuser that directs and scatters light from the shaft to the panel arranged over the base to illuminate the graphic of the panel.

10. The pointer of claim 1, wherein the graphic is molded together with the panel by two-shot molding.

11. The pointer of claim 10, wherein the graphic is at least one of laser etched into an acrylic material of the panel, pad printed on the panel, chrome plated on the panel, hot stamped on the panel, and deposited on the panel by physical vapor deposition (PVD).

12. The pointer of claim 1, further comprising a motor connected to the shaft to rotate the pointer.

13. The pointer of claim 1, further comprising a light emitting element aligned with the shaft to direct light through the shaft to the diffuser.

14. The pointer of claim 1, further comprising only a single light emitting diode (LED) aligned with the shaft to direct light through the shaft to the diffuser.

15. The pointer of claim 1, wherein the diffuser includes a disk arranged on a top of the base and a bottom portion on a bottom surface of the base, both the disk and the bottom portion include reflective surfaces, the shaft extends through an aperture of the bottom portion.

16. An instrument panel comprising:
    a pointer including:
       a base;
       a shaft extending from the base;
       a blade extending from the base to reference indications on the instrument cluster; and
       a light diffuser heat staked to the base over the shaft;
    a panel arranged over the base, the panel including a graphic illuminated by light from the light diffuser passing through the panel;
    a motor connected to the shaft to rotate the pointer and move the blade about a meter of the instrument panel; and
    a light emitting element aligned with the shaft to direct light through the shaft to the base and the light diffuser;
    wherein the light diffuser includes an angled surface to direct light from the light emitting element along a length of the blade; and
    wherein the light diffuser is configured to direct and scatter light from the light emitting element to the graphic of the panel to illuminate the graphic.

17. The instrument panel of claim 16, wherein the diffuser includes a disk arranged on a top of the base and a bottom portion on a bottom surface of the base, both the disk and the bottom portion include reflective surfaces, the shaft extends through an aperture of the bottom portion.

18. The instrument panel of claim 16, wherein the diffuser includes a circular reflective portion on an outer surface of the diffuser that directs light from the shaft to the panel arranged over the base to illuminate the panel.

19. The instrument panel of claim 16, further comprising a tapered portion between the base and the blade that tapers inward as the tapered portion extends from the base to an arm to direct light reflected by the diffuser to the arm.

\* \* \* \* \*